US009768988B1

(12) United States Patent
Pokharel et al.

(10) Patent No.: US 9,768,988 B1
(45) Date of Patent: Sep. 19, 2017

(54) JOINTLY OPTIMIZING SIGNAL EQUALIZATION AND BIT DETECTION IN A READ CHANNEL

(71) Applicant: Seagate Technology LLC, Cupertino, CA (US)

(72) Inventors: Puskal Prasad Pokharel, Edina, MN (US); Mustafa Can Ozturk, Eden Prairie, MN (US); Barmeshwar Vikramaditya, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 739 days.

(21) Appl. No.: 13/722,578

(22) Filed: Dec. 20, 2012

(51) Int. Cl.
H03H 7/40 (2006.01)
H03H 7/30 (2006.01)
H03K 5/159 (2006.01)
H04L 25/03 (2006.01)

(52) U.S. Cl.
CPC .............. H04L 25/03968 (2013.01)

(58) Field of Classification Search
CPC ........ G11B 20/10009; G11B 20/10046; G11B 20/10055; G11B 20/10296; G11B 20/10481; G11B 2220/2516
USPC ......................................... 375/231, 232, 262
See application file for complete search history.

(56) References Cited

U.S. PATENT DOCUMENTS

| 5,961,658 | A | * | 10/1999 | Reed et al. | 714/746 |
| 6,594,103 | B1 | * | 7/2003 | Despain et al. | 360/77.06 |
| 7,194,674 | B2 | * | 3/2007 | Okumura et al. | 714/795 |
| 7,440,208 | B1 | * | 10/2008 | McEwen et al. | 360/39 |
| 2003/0011918 | A1 | * | 1/2003 | Heydari et al. | 360/39 |
| 2003/0026016 | A1 | * | 2/2003 | Heydari et al. | 360/29 |
| 2005/0180298 | A1 | * | 8/2005 | Horibe et al. | 369/124.1 |
| 2005/0264922 | A1 | * | 12/2005 | Erden et al. | 360/78.04 |
| 2006/0087947 | A1 | * | 4/2006 | Minemura et al. | 369/59.22 |
| 2006/0262687 | A1 | * | 11/2006 | Minemura | 369/53.11 |
| 2007/0234188 | A1 | * | 10/2007 | Shiraishi | 714/794 |
| 2008/0175422 | A1 | * | 7/2008 | Kates | 381/316 |

* cited by examiner

Primary Examiner — Shuwang Liu
Assistant Examiner — Sung Ahn
(74) Attorney, Agent, or Firm — Holzer Patel Drennan

(57) ABSTRACT

An apparatus and associated methodology providing read channel circuitry having a signal equalizer that sends an equalized signal to a bit detector. The read channel circuitry is capable of sampling values of the equalized signal to identify a bit transition from among a predefined plurality of different bit transitions. The apparatus may have channel optimization (CO) logic that, based on the input signal and the sampling of the equalized signal, defines first values for a programmable parameter of the bit detector that substantially maximizes vector separations among vectors of waveform target samples corresponding to the predefined plurality of different bit transitions, while the CO logic also defines second values for a programmable parameter of the equalizer that substantially minimizes the mean squared separation of the equalized signal segment for each bit transition from the waveform target corresponding to that bit transition.

20 Claims, 3 Drawing Sheets

JOINTLY OPTIMIZING SIGNAL EQUALIZATION AND BIT DETECTION IN A READ CHANNEL

SUMMARY

Some embodiments of the described technology contemplate an apparatus for processing an input signal. The apparatus includes read channel circuitry having a signal equalizer that sends an equalized signal to a bit detector. The read channel circuitry is capable of sampling values of the equalized signal to identify a bit transition from among a predefined plurality of different bit transitions. In an embodiment the apparatus may include channel optimization (CO) logic that, based on the input signal and the sampling of the equalized signal, defines first values for a programmable parameter of the bit detector that substantially maximizes vector separations among vectors of waveform target samples corresponding to the predefined plurality of different bit transitions while also defining second values for a programmable parameter of the equalizer that substantially minimizes the mean squared separation of the equalized signal segment for each bit transition from the waveform target corresponding to that bit transition.

Some embodiments of the described technology contemplate a method including operations such as: setting tap weights in a finite impulse response (FIR) filter to predetermined nominal values; defining targets for a Viterbi bit detector based on results of digitized (ADC) data samples of a known signal, the targets substantially maximizing a target vector separation between target vectors corresponding to different predefined bit transitions; and after defining the targets, defining optimized values for the tap weights that substantially minimize the mean square difference between the FIR filter output and the targets.

Some embodiments of the described technology contemplate a read channel circuit that may have channel optimization (CO) logic defining targets for a Viterbi detector by jointly substantially maximizing target vector separations among a plurality of predefined different bit transitions while minimizing a finite impulse response (FIR) filter variance in terms of FIR filter output with respect to the defined target vectors.

DETAILED DESCRIPTION

Initially, it is to be appreciated that this disclosure is by way of example only, not by limitation. The read channel concepts herein are not limited to use or application with any specific system or method that reads a data signal. Thus, although the instrumentalities described herein are for the convenience of explanation, shown and described with respect to exemplary embodiments, it will be appreciated that the principles herein may be applied equally in other types of systems and methods employing a read channel.

Figure 1:
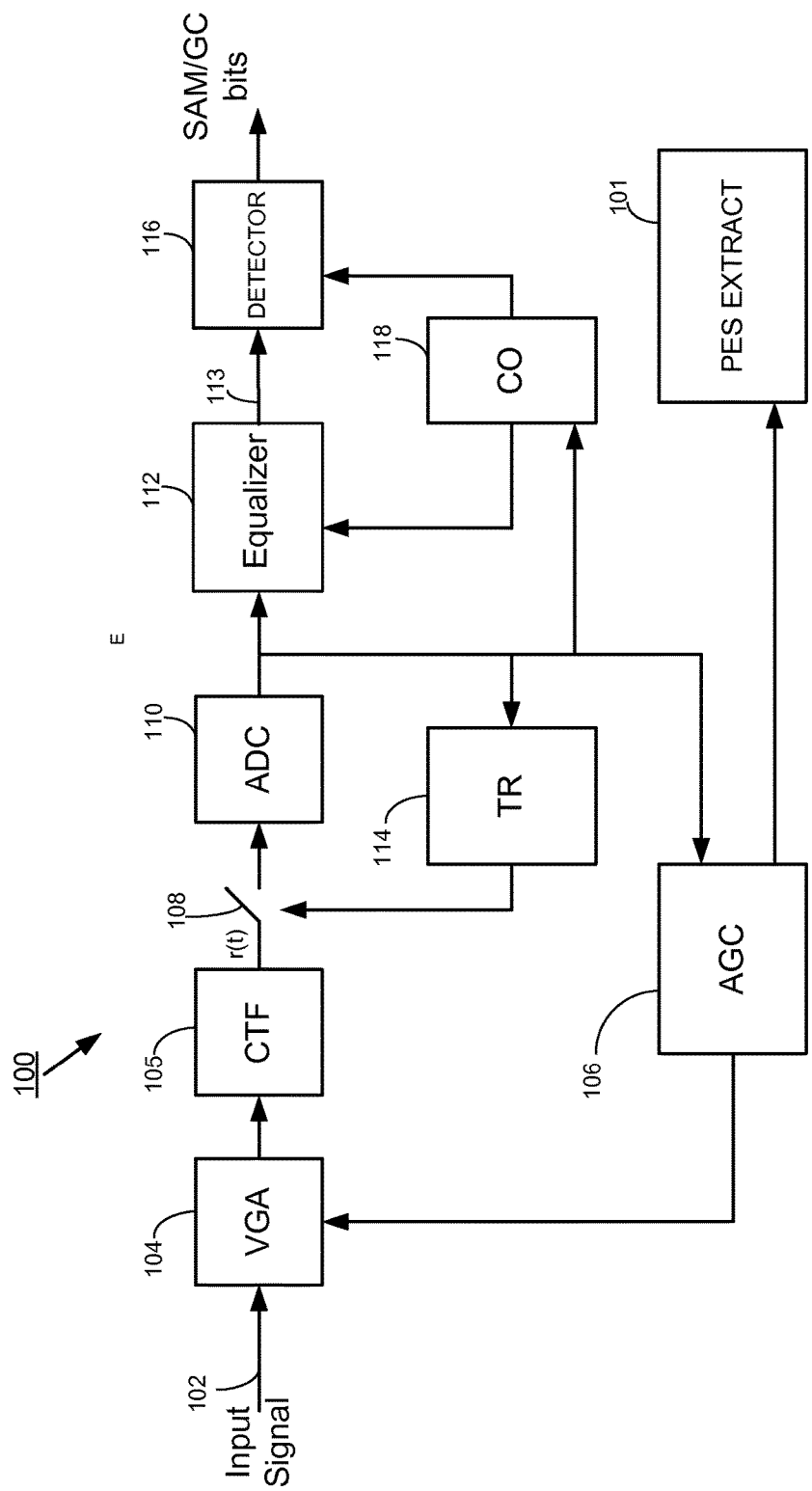
FIG. 1 depicts a portion of read channel circuitry.

FIG. 1 depicts a portion 100 of read channel circuitry (or read channel 100 herein) in a disc drive data storage device, for purposes of this illustrative example. The disc drive includes a plurality of magnetic recording disks that are mounted to a rotatable hub of a spindle motor and rotated at a high speed. An array of read/write heads is selectively moved close to surfaces of the discs in a data transfer relationship therebetween. The heads are radially positioned by a rotary actuator and a servo control system.

The servo control system operates in two primary modes: seeking and track following. During a seek, a selected head is moved from an initial track to a target track on the corresponding disc surface. Upon reaching the target track, the servo control system switches to the track following mode to maintain the head in the data transfer relationship with the target track. During track following, prerecorded servo burst fields are sensed by the head and demodulated to extract a position error signal (PES) 101, which provides an indication of the position error of the head away from a desired location along the track (e.g., the track center). The PES is then converted into an actuator control signal, which is fed back to a head actuator that positions the head.

As the areal storage density of magnetic disc drives increases, so does the need for more precise position control when track following, especially in the presence of vibrations which can cause non-repeatable runout (NRRO) of the position error.

The read channel 100 receives an analog input signal 102, and is capable of mapping a sample sequence (such as the four samples per symbol, or dibit, discussed below) to one of a plurality of predefined different transition waveforms corresponding to bit transitions.

The read channel 100 as depicted includes a variable gain amplifier (VGA) 104, a continuous time filter (CTF) 105, and an adaptive gain control (AGC) 106 to normalize the input signal 102 to a selected magnitude range suitable for signal processing. A sampling switch 108 sends selectively timed sequences of the processed input signal to an analog-to-digital converter (ADC) 110 for digital sampling.

An n-order equalizer 112 performs time-domain equalization to filter the digitized signal to a desired response waveform in an equalized signal 113. For purposes of this description the n-order equalizer 112 may be a finite impulse response (FIR) filter, although the contemplated embodiments of the described technology are not so limited. While a variety of digital signal processing techniques may be utilized, the FIR filter advantageously utilizes a series of internal delay blocks and tap weight coefficient addition blocks to filter the samples to a selected class of ideal equalized target waveforms, such as PR4 or EPR4. The FIR filter updates the waveform via outputs that cover multiple clock cycles.

The output of the ADC 110 (or alternatively the FIR filter output) is provided to a timing recovery (TR) block 114 that applies timing recovery functions including the periodic timewise shifting of the sampling by control of the sampling switch 108.

A channel detector 116 generally maps the waveform samples to user bits. For purposes of this description the detector 116 may be a Viterbi detector although the contemplated embodiments of the described technology are not so limited. The Viterbi detector calculates branch metrics via a statistical derivation of the likelihood that an observed FIR filter output (equalized signal 113 waveform transition) matches one of a predefined number of different pattern-dependent targets.

A channel optimization (CO) block 118 executes computerized instructions performing CO logic that reduces bit errors when reading the input signal 102. The CO logic, based on the input signal 102 and the sampling of the equalized signal 113, may jointly maximize vector separations among vectors of waveform target samples corresponding to the predefined plurality of different bit transitions while minimizing the mean squared distance of a FIR filter output signal segment vector for each bit transition from the waveform target corresponding to that bit transition. By "based on," it is meant that the CO logic has information about the input signal 102 and the sampling of the equalized signal 113 and bases its action upon that information.

Figure 2:
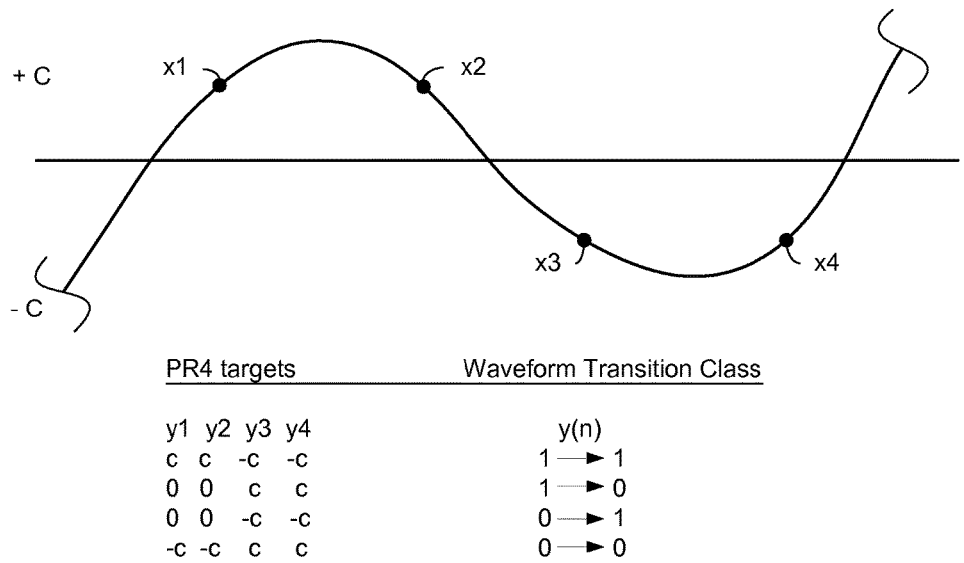
FIG. 2 depicts an input signal waveform sampled at four samples per dibit cycle.
Figure 3:
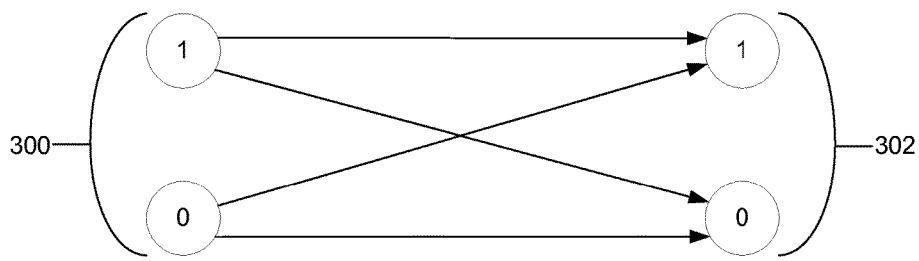
FIG. 3 depicts a binary branch metric trellis for binary value shift possibilities from a first bit value to a second bit value.

FIG. 2 graphically depicts an illustrative waveform for defining wide bi-phase encoded symbols. FIG. 3 depicts each branch metric is a calculated likelihood that a particular predefined waveform transition was observed from a detected bit combination. That is, in these illustrative embodiments the trellis depicts all the binary value shift possibilities from a first bit value 300 to a second bit value 302. The four possible bit transitions are (1→1), (1→0), (0→1), and (0→0), and for purposes of the equations herein the bit transitions are denoted by respective subscripts 1, 2, 3, 4 on variables as follows:

$$\text{Variable}_1: (1 \to 1) \quad (1)$$

$$\text{Variable}_2: (1 \to 0) \quad (2)$$

$$\text{Variable}_3: (0 \to 1) \quad (3)$$

$$\text{Variable}_4: (0 \to 0) \quad (4)$$

The corresponding branch metrics are:

$$(1 \to 1): \Sigma_{i=0}^{3} [y_{n+i} - T_{1i}]^2 \quad (5)$$

$$(1 \to 0): \Sigma_{i=0}^{3} [y_{n+i} - T_{2i}]^2 \quad (6)$$

$$(0 \to 1): \Sigma_{i=0}^{3} [y_{n+i} - T_{3i}]^2 \quad (7)$$

$$(0 \to 0): \Sigma_{i=0}^{3} [y_{n+i} - T_{4i}]^2 \quad (8)$$

Where $T_k$ represents the target vector of expected values for transition type "k" (listed above as 1, 2, 3, 4) against which the FIR output samples $y_n$ are compared.

Assuming an M tap FIR filter w and the digitized signal samples $x(n)$, the FIR filter output is:

$$y(n) = w^T X(n) \quad (9)$$

where:

$$X(n) = \begin{bmatrix} x(n) \\ x(n-1) \\ \vdots \\ x(n-M+1) \end{bmatrix} \quad (10)$$

$X(n)$ need not contain consecutive $x(n)$ vectors. For example, without limitation, the sampling could be conducted so that the FIR filter output is downsampled. A downsampling of two, for example, would contain only the odd or even indexed $x(n)$ vectors. Generally speaking for purposes of this description, the $i^{th}$ vector element of $X(n)$ is denoted as $x(n)_i$, where $i=1, 2, 3 \ldots L$. Thus, the FIR filter output samples passed on to the Viterbi detector for purposes of determining the branch metric may be defined in terms of:

$$y(n) = [w^T x(n)_1 \; w^T x(n)_2 \ldots w^T x(n)_L] \quad (11)$$

Each of the FIR filter outputs $y(n)$ corresponds to one of the waveform transitions in equations (1)-(4) and thus will be labeled $y_1(n)$, $y_2(n)$, $y_3(n)$, and $y_4(n)$ respectively corresponding to the transitions 1, 2, 3, 4 as stated in equations (1)-(4).

transition 1 (1→1), with corresponding $y_1(n)$
transition 2 (1→0), with corresponding $y_2(n)$
transition 3 (0→1), with corresponding $y_3(n)$
transition 4 (0→0), with corresponding $y_4(n)$ For each transition class k, there is a target vector $T_k$ against which $y(n)$ is compared by the Viterbi detector to determine the branch metric. The present embodiments optimize that determination, thereby reducing bit error rate, by jointly optimizing two conditions: (1) maximizing the separation between the target vector $T_j$ of one transition class "j" and a different target vector $T_k$ of another transition class "k"; and (2) minimizing the mean square distance (variance) between the FIR filter output $y_k(n)$ and the target vector $T_k$ for the respective transition class (or type, k=1, 2, 3, or 4, as listed in (1)-(4)).

In determining the spacing between each component $T_{ji}$ of vector $T_j$ and the corresponding components $T_{ki}$ of vector $T_k$, where $T_k$ is the mean of all $y_k(n)$ (the vector y at time index n corresponding to transition type, or class, k) for waveform transition k such that:

$$T_k = \langle y_k(n) \rangle_n \quad (12)$$

where $\langle * \rangle_n$ represents the average over n.

First formulating the analysis for just the $i^{th}$ component, for simplicity sake $T_{ki}$, $y_k(n)_i$, and the like will be denoted by simply $T_k$, $y_k(n)$ and the like with the understanding they are the $i^{th}$ component of the respective vector. The vector spacing (squared difference) between $T_j$ and $T_k$ is:

$$D_{kj} = [T_j - T_k]^2 = [\langle y_j(n) \rangle_n - \langle y_k(n) \rangle_n]^2 \quad (13)$$

$$= [w^T (\langle x_j(n) \rangle_n - \langle x_k(n) \rangle_n)]^2 \quad (14)$$

$$= w^T (m_j - m_k)(m_j - m_k)^T w \quad (15)$$

$$= w^T S_{kj} w \quad (16)$$

where $m_k = \langle x_k(n) \rangle_n$ and $S_{kj}$ is the between-class scatter matrix of transition type (or class) k with respect to transition type (or class) j.

As for the second optimization, the variance of $y_k(n)$ is:

$$V_k = \langle (y_k(n) - \langle y_k(n) \rangle_n)^2 \rangle_n \quad (17)$$

$$= \langle [w^T (x_k(n) - m_k)]^2 \rangle_n \quad (18)$$

$$= w^T \langle (x_k(n) - m_k)(x_k(n) - m_k)^T \rangle_n w \quad (19)$$

$$= w^T S_k w \quad (20)$$

where $S_k$ is the within classes scatter matrix of transition k. The combined variance for transitions j and k, assuming they are not correlated, is:

$$V_{kj} = V_k + V_j = w^T (S_k + S_j) w = w^T (S'_{kj}) w \quad (21)$$

Where $S'_{kj} = S_k + S_j$ is the within class scatter matrix for transitions k and j.

Thus, the optimal FIR filter w that jointly maximizes the separation between transitions k and j while minimizing the FIR filter variance is that which maximizes the cost function:

$$J_{kj}(w) = \frac{D_{kj}}{V_{kj}} = \frac{w^T S_{kj} w}{w^T S'_{kj} w} \tag{22}$$

An equivalent but computationally more favorable definition for the within-class scatter matrix for transitions k and j is given by:

$$S_{kj}{}^a = (m_k-m)(m_k-m)^T + (m_j-m)(m_j-m)^T \tag{23}$$

This is a computationally more tractable formulation that can be used instead of $S'_{kj}$ in equation 22. Here, m is the overall mean of the data, $m = \langle x(n) \rangle_n$.

Reiterating, each of the y(n) can be classified and represented as $y_k(n)$ coming from one of the four transitions (1→1, 1→0, 0→1, 0→0) indexed as k=1, 2, 3, 4. Correspondingly, X(n) can be represented as $X_k(n)$ and $x(n)_i$ can be represented as $x_k(n)_i$ belonging to the transition class k. It is advantageous to make the $y_k(n)$ for each class transition k as far from all the other transition classes as possible and also keep the variance of the estimates low. Preferably, the linear discriminant problem is formulated for each of the components of the $y_k(n)$, solving for all four of the bit transition possibilities in the illustrative embodiments described herein. Thus, considering only the $i^{th}$ component of y(n), resulting from $x_k(n)_i$ (the $i^{th}$ component for the transition class/type k obtained from equation (11), $y_k(n)_i = w^T x_k(n)_i$), the between-class scatter matrix for the $i^{th}$ component can be written for all bit transition possibilities:

$$S_{Bi} = \Sigma_{k=1}^4 (\mu_{ki}-\mu_i)(\mu_{ki}-\mu i)^T \tag{24}$$

where $\mu_{ki} = \langle x_k(n)_i \rangle_n$ and $\mu_i = \langle x_k(n)_i \rangle_{nk}$. That is, $\langle x_k(n)_i \rangle_{nk}$ represents the average of $x_k(n)_i$ over indices n and k and $\langle x_k(n)_i \rangle_n$ represents the average over n.

The CO logic also derives the within-class scatter matrix for the $i^{th}$ component of y(n) by likewise including all of the terms corresponding to the four waveform transitions:

$$S_{Wi} = \Sigma_{k=1}^4 \langle (x_k(n)_i - \mu_{ki})(x_k(n)_i - \mu_{ki})^T \rangle_n \tag{25}$$

The described technology contemplates the overall between-class and within-class scatter matrices as being the sum of the corresponding scatter matrices with the individual L components defined as above:

$$S_B = \Sigma_{k=1}^4 \Sigma_{i=1}^L (\mu_{ki}-\mu_i)^T \tag{26}$$

$$S_W = \Sigma_{k=1}^4 \Sigma_{i=1}^L \langle (x_k(n)_i - \mu_{ki})(x_k(n)_i - \mu_{ki})^T \rangle \tag{27}$$

The optimal FIR filter w* is that which maximizes the objective function:

$$J(w) = \frac{w^T S_B w}{w^T S_W w} \tag{28}$$

Thus, the optimal FIR filter w*, the stationary point of equation (28), satisfies the following relationship:

$$S_B w^* = J(w^*) S_W w^* \tag{29}$$

This relationship is solved as J(w*) being the largest Eigen value with the corresponding Eigen vector w. * The solution w* can be scaled as desired for advantageous reasons such as targeted output levels, channel requirements, and the like. The corresponding target for use by the Viterbi bit detector for the waveform transition class k is:

$$v_k = w^* [\mu_{k1} \mu_{k2} \ldots \mu_{kL}] \tag{30}$$

Figure 4:
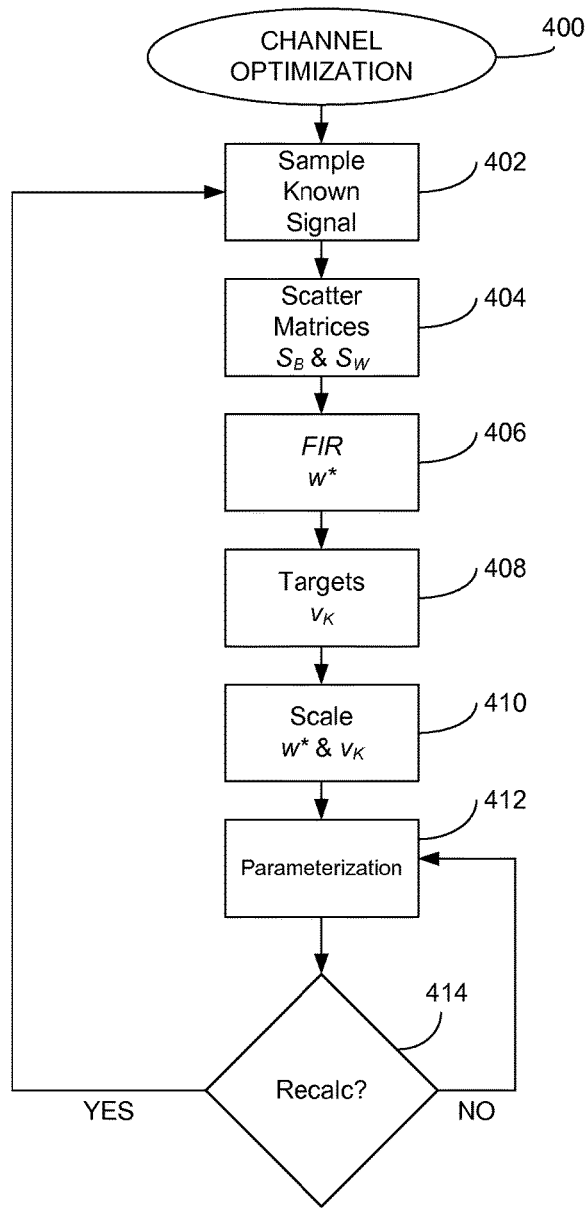
FIG. 4 illustrates example operations for optimizing a read channel.

Turning now to FIG. 4 which illustrates example operations in a method 400 for CHANNEL OPTIMIZATION. The method 400 begins in block 402 which samples a signal such as the equalized signal 113 in FIG. 1. As discussed previously, this signal sampling may include appropriate gain adjustment and digital processing, as well as providing predetermined nominal values for the FIR tap weights.

On the basis of using the predetermined nominal FIR tap weights, block 404 calculates the between-class and within-class scatter matrices, $S_B$ and $S_W$ respectively, such as by processing the data with equations (26) and (27) discussed in the illustrative embodiments above. In block 406 the optimized FIR output vector w* is derived by finding the principle generalized Eigen vector of $S_B$ and $S_W$, such as by processing the signal data to obtain the two scatter matrices in equation (29) and then using any of the Eigen decomposition methods known in the area of numerical linear algebra as discussed in the illustrative embodiments above. In block 408 the optimized Viterbi target vector $v_k$ is derived in relation to the optimized FIR output vector w*, such as by processing the signal data with equation (30) discussed in the illustrative examples above. The optimized values w* and $v_k$ can be scaled in block 410 as discussed above as might be appropriate for targeted output values or other channel requirements.

In block 412 the read channel is parameterized by replacing the nominal tap weight values in the FIR filter and replacing any existing target values in the Viterbi detector with the optimized values w* and $v_k$, respectively, that are derived in accordance with embodiments of the described technology. In some embodiments the method 400 may be performed during an initialization sequence, such as during a power on or power level change event. In other embodiments the method 400 may be routinely performed even after an initialization, such as during an operational sequence of the read channel. The latter advantageously provides for a continually iterative parameterization of the read channel to compensate for transient variations such as might be experienced by changes in input signal quality or external influences such as environmental changes. In any event, block 414 makes a determination as to whether the optimized parameters need to be recalculated. If the determination of block 414 is "no," then processing continues in block 412 according to the previously derived values w* and $v_k$. However, if the determination of block 414 is "yes," then control returns to block 402 where a new set of optimized values w* and $v_k$ begins to be derived by once again sampling a known input signal.

A linear phase constraint may be maintained if the optimized FIR is constrained to being symmetric. Generally, for a FIR filter of length M as in equation (10) the linear transforms to reduce the dimensionality based on symmetry:

$$x'(n) = Ax(n), \tag{31}$$

$$w' = Bw, \tag{32}$$

where the size of $$A \text{ is } \left[\left(\frac{M}{2}\right)\right] \times M$$

and $$A = \begin{bmatrix} 1 & 0 & 0 & \ldots & 0 & 0 & 1 \\ 0 & 1 & 0 & \ldots & 0 & 1 & 0 \\ \vdots & & \ddots & & \ddots & & \vdots \\ 0 & 0 & 0 & 1 & 0 & 0 & 0 \end{bmatrix} \tag{33}$$

and B is the same size as A and $$B = \begin{bmatrix} 1 & 0 & 0 & 0 & 0 & \ldots & 0 \\ 0 & 1 & 0 & 0 & 0 & \ldots & 0 \\ \vdots & & \ddots & & \vdots & \ddots & \vdots \\ 0 & 0 & 0 & 1 & 0 & 0 & 0 \end{bmatrix}. \qquad (34)$$

Once the problem is solved in the lower dimensional space obtaining the optimal w', the corresponding optimal w can be obtained simply by tiling the first $$\left\lfloor \left(\frac{M}{2}\right) \right\rfloor$$

elements of w' at the end in reverse order as described in the expression below:

$$w = A^T w' \qquad (35)$$

Thus:

$$y(n) = w^T x(n) = (A^T w')^T x(n) = w'^T A x(n) = w'^T x'(n) \qquad (36)$$

This can be demonstrated with an example. If we are using a 5 tap FIR, the corresponding time embedded vectors are five dimensional. With the FIR being symmetric, it can be represented as:

$$w = \begin{bmatrix} a \\ b \\ c \\ b \\ a \end{bmatrix} \qquad (37)$$

And the input data vector at given time n (embedded with the samples corresponding to each FIR tap) can be represented as:

$$x = \begin{bmatrix} x_1 \\ x_2 \\ x_3 \\ x_4 \\ x_5 \end{bmatrix} \qquad (38)$$

The output of the filter would be $y(n) = w^T x = a(x_1 + x_5) + b(x_2 + x_4) + cx_3$. Thus, a linearly transformed three dimension version of x can be created as:

$$x' = \begin{bmatrix} 1 & 0 & 0 & 0 & 1 \\ 0 & 1 & 0 & 1 & 0 \\ 0 & 0 & 1 & 0 & 0 \end{bmatrix} \begin{bmatrix} x_1 \\ x_2 \\ x_3 \\ x_4 \\ x_5 \end{bmatrix} = \begin{bmatrix} x_1 + x_5 \\ x_2 + x_4 \\ x_3 \end{bmatrix} \qquad (39)$$

With the corresponding filter being $$w' = \begin{bmatrix} a \\ b \\ c \end{bmatrix} \qquad (40)$$

It is to be understood that even though numerous characteristics and advantages of various embodiments of the described technology have been set forth in the foregoing description, together with the details of the structure and function of various embodiments of the invention, this disclosure is illustrative only, and changes may be made in detail, especially in matters of structure and arrangement of parts within the principles of the described technology to the full extent indicated by the broad general meaning of the terms in which the appended claims are expressed. For example, other read channel signal processing components and various arrangements thereof than the FIR filter and Viterbi detector described are contemplated while still maintaining substantially the same functionality without departing from the scope and spirit of the claimed invention. Further, although the illustrative embodiments described herein are directed to data storage drives, and related technology, it will be appreciated by those skilled in the art that the claimed invention can be applied to other devices employing a read channel as well without departing from the spirit and scope of the described technology.

What is claimed is:

1. An apparatus for processing an input signal, comprising:
    read channel circuitry including a signal equalizer that sends an equalized signal to a bit detector, the read channel circuitry capable of sampling values of the equalized signal to identify a bit transition from among a predefined plurality of different bit transitions; and
    channel optimization (CO) logic that, in response to the input signal and the sampling value of the equalized signal, defines first values for a programmable parameter of the bit detector, the first values substantially maximizing vector separations among vectors of waveform target samples corresponding to the predefined plurality of different bit transitions while also defining second values for a programmable parameter of the signal equalizer that substantially minimizes the mean squared separation of the equalized signal segment for each bit transition from the waveform target corresponding to that bit transition.

2. The apparatus of claim 1 wherein the CO logic derives a between-class scatter matrix for one of the first values of one bit transition with respect to another one of the first values of another bit transition.

3. The apparatus of claim 2 wherein the CO logic derives a within-class scatter matrix of the average variance within each of the bit transitions.

4. The apparatus of claim 1 wherein the predefined plurality of different bit transitions includes all binary value shift possibilities from a first bit value to a second bit value.

5. The apparatus of claim 1 wherein the bit detector comprises a Viterbi detector and the first values are detector target values.

6. The apparatus of claim 5 wherein the signal equalizer comprises a finite impulse response (FIR) filter and the second values are tap weight values.

7. The apparatus of claim 6 wherein the CO logic parameterizes the read channel circuitry with the target values and the tap weight values during an initialization sequence of processing activities by the read channel circuitry.

8. The apparatus of claim 7 wherein the CO logic redefines the target values and the tap weight values after the initialization sequence is completed by parameterizing the read channel circuitry with second target values and second tap weight values during an operational sequence of processing activities by the read channel circuitry.

9. The apparatus of claim 6 wherein the tap weight values are constrained to be symmetric to maintain a linear phase filter.

10. A method comprising:
setting tap weights in a finite impulse response (FIR) filter to predetermined nominal values;
defining targets for a Viterbi bit detector in response to results of sampling a known signal, the targets substantially maximizing a target vector separation between target vectors corresponding to different predefined bit transitions; and
after defining the targets, defining optimized values for the tap weights that substantially minimize the mean square difference between the output of the FIR filter output and the targets.

11. The method of claim 10 wherein the defining targets comprises deriving a between-class scatter matrix of the sampling values classified to one of a plurality of bit transitions with respect to the sampling values classified to another of the plurality of bit transitions.

12. The method of claim 11 wherein the FIR filter output includes equalized values and defining the optimized values for the tap weights comprises substantially minimizing the difference between the equalized values and the targets.

13. The method of claim 10 wherein the defining targets is characterized by substantially maximizing vector separations among a plurality of different predefined bit transitions encompassing all binary value shift possibilities from a first bit value to a second bit value.

14. The method of claim 10 comprising parameterizing the FIR filter by changing the tap weights from the nominal values to the optimized values and parameterizing the Viterbi bit detector by setting the targets to the Viterbi bit detector.

15. The method of claim 14 wherein the parameterization occurs during an initialization sequence of processing activities.

16. The method of claim 15 comprising further sampling a known signal after the parameterization.

17. The method of claim 16 comprising, from results of the further sampling and after the parameterization, defining second targets for the Viterbi detector that substantially maximize a vector separation between target vectors corresponding to different predefined bit transitions.

18. The method of claim 17 comprising defining second optimized values for the tap weights in relation to minimizing FIR filter variance from the second targets.

19. The method of claim 18 further comprising reparameterizing the Viterbi bit detector with the second targets and reparameterizing the FIR filter with the second optimized values for the tap weights after the initialization sequence during an operational sequence of processing activities.

20. A system comprising:
a viterbi detector; and
a read channel circuit comprising channel optimization (CO) logic defining targets for the Viterbi detector by jointly substantially maximizing target vector separations among a plurality of predefined different bit transitions while minimizing filter variance of a finite impulse response (FIR) filter in terms of FIR filter output with respect to the defined target vectors.

* * * * *